United States Patent [19]
Lin

[11] Patent Number: 6,031,010
[45] Date of Patent: Feb. 29, 2000

[54] POLYURETHANE FOAM COMPOSITION HAVING IMPROVED FLEX FATIGUE

[75] Inventor: Nai Wen Lin, Rochester Hills, Mich.

[73] Assignee: Imperial Chemical Industries PLC, London, United Kingdom

[21] Appl. No.: 08/909,109

[22] Filed: Aug. 11, 1997

[51] Int. Cl.⁷ .................................................. C08G 18/14
[52] U.S. Cl. ........................... 521/51; 521/159; 521/160; 521/161; 521/170; 521/172; 521/174; 521/176
[58] Field of Search .............................. 521/51, 159, 160, 521/161, 170, 172, 174, 176

[56] References Cited

U.S. PATENT DOCUMENTS 4,559,366  12/1985  Hostettler .
5,166,183  11/1992  Franyutti et al. ........................ 521/51
5,216,035  6/1993  Harrison et al. ........................ 521/159

FOREIGN PATENT DOCUMENTS 0420273  4/1991  European Pat. Off. .
0497492  8/1992  European Pat. Off. .

*Primary Examiner*—John M. Cooney, Jr.

[57] ABSTRACT

The present invention relates to a process for preparing a flexible polyurethane foam from the reaction of a polyisocyanate composition prepared from the reaction of an excess of organic polyisocyanate and a polyether polyol having a high ethylene oxide content and an isocyanate reactive composition comprising a chain extending agent and a combination of a polyether polyol having a high ethylene oxide content and a random copolymer having a high ethylene oxide content, and the product prepared therefrom.

45 Claims, 2 Drawing Sheets

6,031,010

POLYURETHANE FOAM COMPOSITION HAVING IMPROVED FLEX FATIGUE

FIELD OF THE INVENTION

The present invention relates to a water blown integral skin polyurethane foam prepared from an organic polyisocyanate and two polyether polyols having a high ethylene oxide content in synergistically effective amounts, to an isocyanate-reaction system useful in preparing such foams, and to the process of preparing the same.

BACKGROUND OF THE INVENTION

Elastomeric polyurethane foams for applications, such as for example, shoe soles, desirably exhibit good physical properties including abrasion resistance, flexibility and durability. Typically, these foams are prepared by reacting an organic isocyanate with a substance having at least one isocyanate reactive group in the presence of a catalyst, blowing agent and a variety of optional additives. The reaction is generally carried out in a mold whereby a higher density skin forms at the interface of the reaction mixture and the inner surface of the mold.

At the present time, one of the most common types of blowing agents utilized in the preparation of such polyurethane foams are the chlorofluorocarbons (CFCs), e.g., freon-11. Shoe soles comprised of these polyurethane foams, especially freon blown polyurethane foams, have a very thick skin, are abrasion resistant, stable and exhibit excellent flex fatigue properties.

However, since industry is faced with a mandate to reduce and eventually eliminate the use of CFCs due to environmental concerns, it is necessary to find an alternative blowing agent. Water is a highly desirable blowing agent and has been used as a blowing agent to prepare lower density polyurethane foams. However, heretofore, water has been found to be generally unacceptable as the sole blowing agent, especially in the preparation of foams intended for use as shoe soles. The density of the polyurethane foams prepared utilizing water as the sole blowing agent is generally too low to provide the adequate stability and cushioning demanded for modern shoes. In addition, shoe soles comprised of water blown polyurethane foams do not have thick skin and exhibit very poor flex fatigue properties. Thus, the shoe soles crack very easily after several flexing operations.

The present inventor, however, has successfully found a reaction system for preparing an all water-blown microcellular integral skin polyurethane foam and has thus overcome the problems described hereinabove. More specifically, utilizing the reaction system of the present invention, the polyurethane foam prepared therefrom has improved flex fatigue properties, making it an ideal material for use in shoe sole compositions. The inventor has found that improved flex properties are realized if the isocyanate reaction component contains a mixture of two high ethylene oxide containing polyols.

SUMMARY OF THE INVENTION

Accordingly, the present invention is directed to an integral skin polyurethane foam prepared by contacting under effective reaction conditions a polyisocyanate composition with an isocyanate reactive composition in the presence of water as the sole blowing agent characterized in that:

(a) the polyisocyanate composition has a free NCO value of about 15% to about 25% and comprises an isocyanate-terminated prepolymer which is the reaction product of an excess of an organic polyisocyanate and a first ethylene oxide capped polyether polyol having an average nominal hydroxyl functionality of 2–6, an equivalent weight ranging from about 700 to about 5000 and an ethylene oxide content of at least 25% by weight, at least about 50% by weight of the total ethylene oxide groups present being capped on said polyether polyol;

(b) the isocyanate reactive composition comprises about 6% to about 12.5% (w/w) of a chain extending agent and a combination of a second ethylene oxide capped polyether polyol and a random copolymer of ethylene oxide and propylene oxide in synergistically effective amounts to form said polyurethane foam, said second ethylene oxide capped polyol having an average nominal hydroxyl functionality of 2–3, an equivalent weight ranging from about 700 to about 5,000, and an ethylene oxide content of at least about 25% by weight, with at least about 50% by weight of the total ethylene oxide groups present being capped on the polyether polyol ethylene oxide, and said copolymer having an average nominal hydroxyl functionality of 2–3, an equivalent weight ranging from about 700 to about 5,000 and an ethylene oxide content of at least about 65% by weight; and (c) water as a blowing agent is present in an amount effective to provide the resulting polymer with a density ranging from about 0.1 to about 1.1 specific gravity, wherein the weight ratio of water to the chain extending agent ranges from about 0.01 to about 0.20. In a preferred embodiment, about 10 to about 250 parts by weight of the isocyanate reactive composition is reacted per 100 parts by weight of the polyisocyanate composition.

The present invention is further directed to a reaction system comprising the polyisocyanate composition and the isocyanate reactive composition described hereinabove, and water wherein the weight ratio of the water to the chain extending agent ranges from about 0.01 to about 0.20. In a preferred embodiment, the weight ratio of the isocyanate reactive composition to the polyisocyanate composition ranges from about 0.1 to about 2.5.

Further the present invention is concerned with a process for preparing the polyurethane foam described hereinabove.

DETAILED DESCRIPTION OF THE INVENTION

Figure 1:
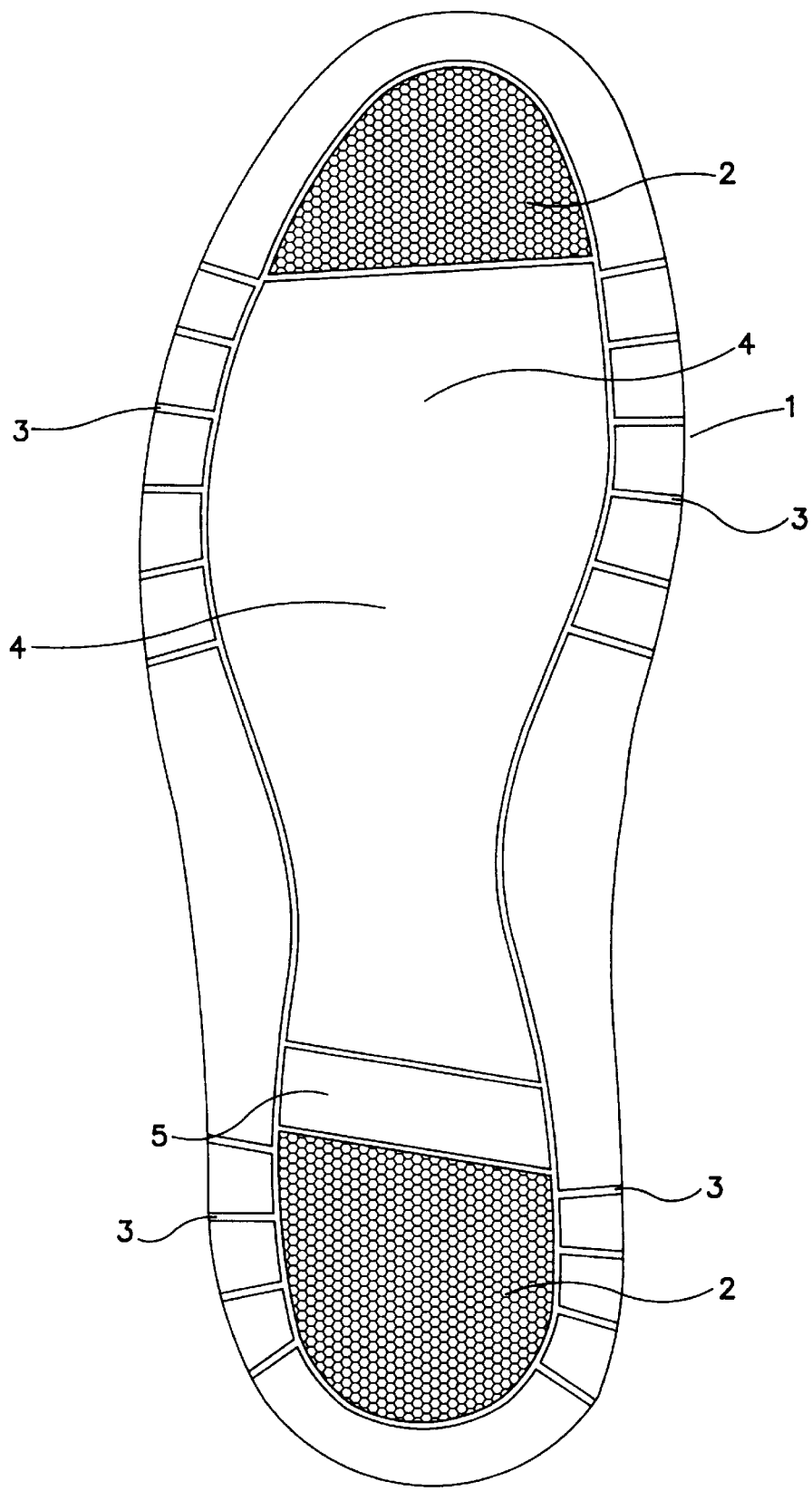
FIG. 1 depicts a shoe sole design identified herein as Style A comprised of the polyurethane foam of the present invention.

An aspect of the present invention is directed to an integral skin polyurethane foam prepared from an isocyanate reactive composition containing a combination of high ethylene oxide-containing polyols. More specifically, one polyol is a ethylene oxide capped polyether polyol which has an ethylene oxide content of at least greater than 25% wherein at least 50% and more preferably at least 75% thereof by weight is at the end of the polymer chain. The other polyol is a random copolymer of ethylene oxide and propylene oxide having an ethylene oxide content of at least about 65% by weight. These two polyols act in a synergistic manner, and when reacted with a chain extending agent form an isocyanate reactive composition which when reacted with the polyisocyanate composition of the present invention in the presence of water forms a polyurethane foam with a flexible integral skin having excellent abrasion resistance and an enhanced resistance to cracking on flex. The polymer skin of the polyurethane foam produced in accordance with the present invention possesses sufficient tensile modulus and elongation and tear strength to survive a 90 to 180 degree bend without exhibiting surface cracks. It is thus ideal for use in shoe sole applications as well as for other molded articles.

As used herein, the term "isocyanate index" or "NCO-index" or "index" is the ratio of NCO groups over isocyanate-reactive hydrogen containing groups present in a formulation, given as a percentage with respect to the amount of isocyanate theoretically required for reacting with the amount of isocyanate-reactive hydrogen containing groups used in a formulation:

$$\text{NCO index} = \frac{[\text{NCO}] \times 100\%}{[\text{active hydrogen-containing groups}]}$$

In other words, the NCO index expresses the percentage of isocyanates actually used in a formulation. Therefore, an index of 100% represents a 1:1 ratio of NCO equivalents to isocyanate-reactive groups.

It should be observed that the isocyanate index as used herein is considered from the point of view of the actual foaming process involving the isocyanate composition and the isocyanate-reactive composition. Any isocyanate groups consumed in a preliminary step to produce the prepolymer or other modified polyisocyanate or any active hydrogens reacted with isocyanate to produce modified polyols or polymers are not taken into account in the calculation of the isocyanate index. Only the free isocyanate groups and the free isocyanate-reactive hydrogen containing groups (including those of the water) present at the actual foam forming stage are taken into account.

The expression "isocyanate-reactive hydrogen-containing groups" as used herein for the purpose of calculating the isocyanate index refers to the total number of hydroxyl and amine groups present in the reactive compositions in the form of polyols, polyamines and/or water; this means that for the purpose of calculating the isocyanate index in the actual foaming process, one hydroxyl group is considered to comprise one reactive hydrogen and one water molecule is considered to comprise two active hydrogens. Primary and secondary amine groups are each considered to contain one (available) isocyanate reactive hydrogen for the purposes of calculating the index.

"Polyurethane foam" refers to cellular products as obtained by reacting polyisocyanate with the isocyanate reactive composition using foaming agents, and, in particular, includes cellular products obtained with water as a reactive foaming agent (involving a reaction of water with isocyanate groups yielding urea linkages and carbon dioxide and producing polyurea-urethane foams).

The term "polyisocyanate composition" is to be construed as including mixtures of isocyanate-terminated prepolymers and free polyisocyanates. Such free polyisocyanates may have been added to the prepolymer as well, provided the free NCO value of the polyisocyanate composition remains at the level as indicated hereinabove.

The term "reaction system" refers to a combination of ingredients wherein the polyisocyanate composition is kept in a container separate from the isocyanate-reactive ingredients.

"Average nominal hydroxyl functionality" is used herein to indicate the number average functionality (number of hydroxyl groups per molecule) of the individual polyether polyol ingredients on the assumption that this is the number average functionality (number of active hydrogen atoms per molecule) of the initiator(s) used in their preparation, although in practice it will often be somewhat less because of some terminal unsaturation.

As used herein it is to be understood, unless indicated to the contrary, that any term in the plural also includes the singular and vice versa.

As indicated hereinabove, the polyurethane foams are prepared according to the process of the present invention by intimately contacting under effective reaction conditions the polyisocyanate composition with the isocyanate reactive composition in the presence of water as the sole blowing agent.

The polyisocyanate composition has a free NCO value of about 15% to about 25% by weight and more preferably from about 17% to about 21% by weight. As described herein, it is comprised of an isocyanate-terminated prepolymer. This prepolymer is the reaction product of an excess of an organic polyisocyanate and an ethylene oxide capped polyether polyol.

The organic polyisocyanate which may be used in the present invention include any of the aliphatic, cycloaliphatic, araliphatic or aromatic polyisocyanates known to those skilled in the art, especially those that are liquid at room temperature. Examples of suitable polyisocyanates include 1, 6-hexamethylene diisocyanate, isophorone diisocyanate, 1, 4-cyclohexane diisocyanate, 4, 4'-dicyclohexylmethane diisocyanate, 1,5-naphthylene diisocyanate, 1,4-xylylene diisocyanate, 1,4-phenylene diisocyanate, 2,4-toluene diisocyanate, 2,6-toluene diisocyanate, and the diphenylmethane diisocyanates ("MDI"), including 4,4'-diphenylmethane diisocyanate, (4,4'-MDI), 2,4'-diphenyl methane diisocyanate (2,4'-MDI), 2,2'-diphenyl methane diisocyanate (2,2'-MDI), and polymethylene polyphenylene polyisocyanates (polymeric MDI) and the like. Mixtures of these polyisocyanate can also be used. Moreover, polyisocyanate variants, i.e., polyisocyanates, especially MDI's, that have been modified in a known manner by the introduction of urethane, allophanate, urea, biuret, carbodiimide, uretonimine, isocyanurate, and/or oxazolidone residues can also be used in the present systems (hereinafter referred to as "MDI variants" or "modified MDI"). These modified polyisocyanates are well known in the art and are prepared by reactions known to the skilled artisan. For example, the uretonimine-carbodiimide-modified polyisocyanate is obtained by employing well-known carbodiimide-promoting catalysts in the polyisocyanate composition to convert the isocyanate to the carbodiimide at temperatures ranging from 50° C. to 250° C., which then proceeds to react with further unconverted polyisocyanates at room temperature to form a uretonimine-modified polyisocyanate. Typical catalysts useful in this conversion to the uretonimine-carbodiimide modified polyisocyanates include phospholene-1-oxides and 1-sulfides, diaza and axaza-phospholanes and phosphorinanes, triaryl arsines and tri-alkyl phosphates described in U.S. Pat. Nos. 5,284,880 and 4,743,626, both of which are herein incorporated by reference.

In general, aromatic polyisocyanates are preferred for use in the present reaction system. The most preferred aromatic polyisocyanate is diphenylmethane diisocyanate (MDI), for example, the 4,4'-MDI, 2,4'-MDI, polymeric MDI, MDI variants and mixtures thereof. By "polymeric MDI, it is meant the polymethylene polyphenylene polyisocyanates which are comprised in the polyisocyanate compositions and which have a functionality of at least 2.5. The polymeric MDI are commercially available and are manufactured by the phosgenation of polyamine mixtures obtained from the condensation of aniline and formaldehyde in appropriate proportions. For the purpose of this invention, polymeric MDI's having functionality in this range 2.5–3.5 and preferably 2.5–3.1 are particularly suitable.

The most preferred MDI is the 4,4'- MDI or a mixture of 4,4'-MDI and 2, 4'-MDI, wherein the mixture comprises 4,4'MDI in an amount greater than about 85% by weight and more preferably greater than about 90% by weight and most preferably greater than about 95% by weight. In addition, polymeric MDI may additionally be present in amounts ranging from 0.4% to about 4%, based upon the total weight of isocyanate present in the polyisocyanate compositions. It is even more preferred that the organic polyisocyanate is a mixture of 4,4'-MDI and 2,4'-MDI as discussed above and a modified MDI, especially a mixture of 4,4'-MDI and 2,4'-MDI and a MDI composition modified by the introduction of urethane, allophanate, urea, biuret, carbodiimide, isocyanate, oxazolidone and/or uretonimine resides. In this more preferred embodiment, it is preferred that the modified MDI be present in about 5% to about 15% by weight of the total amount of isocyanate present in the polyisocyanate composition, and that the 4,4'-MDI is present in amounts greater than about 85% and more preferably greater than 90% by weight of the total amount of isocyanate present in the polyisocyanate composition and that the 2,4'-MDI is present in amounts less than about 7.5% and especially less than about 5% by weight of the total amount of isocyanate present in the polyisocyanate composition. In the most preferred embodiment, the organic polyisocyanate consists of 4,4'-MDI, and 2,4'- MDI and a modified mixture of 4,4'-MDI and 2,4'-MDI, wherein the MDI is modified with uretonimine, in the amounts given hereinabove.

The polyether polyols useful for preparing the isocyanate terminated prepolymer contain at least about 25% by weight ethylene oxide groups, and more preferably about 25% to about 35% by weight ethylene oxide groups. At least 50%, and preferably at least 75% by weight of these ethylene oxide groups are present at the end of the polyether polyol (tipped). The polyether polyols have an average nominal functionality of 2–6, and preferably 2–4. They have a number average equivalent weight of about 700 to about 5,000, and a preferred equivalent weight ranging from about 1000 to about 4,000, and more preferably ranging from about 1200 to about 3500 and most preferably ranging from about 1500 to about 3000.

The polyether polyols which are to be used for preparing the isocyanate-terminated prepolymer include the products obtained by the polymerization of ethylene oxide with another cyclic oxide, for example, propylene oxide in the presence of polyfunctional initiators; however, the product must maintain the requirements described hereinabove. Suitable initiator compounds contain a plurality of active hydrogen atoms and include water and low molecular weight polyols, for example, ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol and the like. Mixtures of initiators and/or cyclic oxide may be used.

Especially useful polyether polyols include poly (oxyethylene oxypropylene) diols and/or triols obtained by the sequential addition of propylene and ethylene oxides to di-or trifunctional initiators, as fully described in the prior art. Mixtures of said diols and triols are also useful.

Examples of the polyether polyol useful in preparing the isocyanate terminated prepolymer of the present invention include Daltocel® F-481, i.e., an EO capped diol of equivalent wt 1870, having 27.1% EO (remainder PO); PBA® 5181 i.e., polyether polyol containing 27% EO (all tipped), MW (molecular weight)=3750, average nominal hydroxy functional is 2; and the like.

The isocyanate-terminated prepolymer is prepared by the reaction of an excess amount of the polyisocyanate with the polyether polyol. The amounts of polyisocyanate and polyether polyol utilized are those known to be effective to obtain a prepolymer having the indicated NCO value utilizing techniques known in the art. For example, the prepolymer may be prepared by reacting the organic polyisocyanate with the polyether polyol followed by dilution with modified polyisocyanate, as defined herein, if present. Alternatively, modified polyisocyanate may be mixed with the unmodified polyisocyanate prior to reaction with the polyol. Such reaction is allowed to take place at effective temperatures to form the prepolymer, such as from about 40° C. to about 100° C., and in general, the use of a catalyst, is optional. The relative amounts of organic polyisocyanate and polyol depend on the desired NCO value of the prepolymer, the NCO value of the polyisocyanate and the OH value of the polyol and can be easily calculated by those skilled in the art.

At least 90% of the groups obtained from the reaction of the polyisocyanate and the polyether polyol in preparing the prepolymer are urethane groups. To the prepolymers so prepared, low amounts (up to 30% by weight) of polyisocyanate or a variant thereof may be added provided the NCO value remains in the indicated range described hereinabove. The amount added is in general preferably less than about 20% by weight based on the total weight of the polyisocyanate composition. The added polyisocyanate or variant my be selected from those mentioned above. Aromatic polyisocyanates and, in particular, MDI based polyisocyanates are preferred. It is even more preferred that a modified polyisocyanate be added, and it is even more preferred that the added polyisocyanate be the variant of the MDI utilized in reacting with the polyol.

The other major component, the isocyanate reactive composition, comprises inter alia, a high ethylene oxide capped polyether polyol ("second polyol"). In fact, the general characteristics of the polyol described hereinabove with respect to the prepolymer is applicable to the ethylene oxide capped polyol utilized in the isocyanate reactive composition, with the exception that it has an average nominal hydroxyl functionality of 2–3 and that the polyol is either a triol or more preferably a diol. Thus, for example, it has a number average equivalent weight of about 700 to about 5,000, and a preferred range of about 1000 to about 4000, and more preferably ranging from about 1200 to about 3500 and most preferably ranging from about 1500 to about 3000. It contains at least about 25% by weight ethylene oxide groups and more preferably from about 25% to about 35% by weight of ethylene oxide groups. At least 50%, and preferably at least 75% by weight of the ethylene oxide groups are present at the end of the polyether polyol (tipped).

It is preferred that the ethylene oxide capped polyol utilized in the isocyanate reactive composition be the same as that utilized in preparing the prepolymer described hereinabove.

Another component of the isocyanate reactive composition is the random copolymer of ethylene oxide and propylene oxide. The copolymer has an average nominal hydroxyl functionality of 2 to 4 and preferably 2 to 3. Its equivalent weight ranges from about 700 to about 5,000, and more preferably from about 1000 to about 3000 and most preferably from about 1200 to about 2000. This copolymer also has a high ethylene oxide content. The ethylene oxide is present in amounts greater than about 60% by weight of the copolymer and more preferably ranges from about 65% by weight to about 85% by weight. The copolymers are diols or triols of poly-(oxyethyleneoxypropylene) polyols obtained by the sequential addition of propylene and ethylene oxides to di- or trifunctional initiators, such as glycols (e.g. ethylene glycol, propylene glycol, diethylene glycol and the like); cyclohexane dimethanol, resorcinol, trimethylolpropane, 1, 2, 6-hexanetriol, pentaerythritol, and the like. Mixtures of initiators may also be utilized.

Examples of the copolymers include ARCOL®-2580, i.e., a random EO/PO copolymer (having 75% ethylene oxide initiated with trimethylopropane) of equivalent weight of 1335, and the like.

As will be explained in more detail below, the present inventor has found that the combination of the two types of high-EO polyether polyols in the isocyanate reactive composition act synergistically i.e, the combination of the two polyether polyols results in an integral skin polyurethane foam having improved and unexpected flex properties, relative to a polyurethane foam formed with only one of these polyether polyols present. Thus, each is present in the isocyanate reactive composition in synergistic amounts. In a preferred embodiment, the second polyol is present in amounts ranging from about 20% to about 80% by weight of the isocyanate reactive composition and more preferably, from about 40% to about 60% by weight of the isocyanate reactive composition and most preferably about 50% (w/w). On the other hand, the copolymer is preferably present in amounts ranging from about 1.5% to about 23% by weight of the isocyanate reactive composition and most preferably from about 2% to about 10% by weight of the isocyanate reactive composition and most preferably at about 3% by weight thereof.

Besides the two types of polyether polyol indicated hereinabove, the isocyanate reactive composition may additionally contain conventional polymeric polyols, such as a polyether polyol, wherein the ethylene oxide level is below about 25%. These polyols have a molecular weight ranging from about 1,000 to about 10,000 and a functionality of 2–4, and preferably 2–3.

Such conventional polymeric polyols have been fully described in the prior art and include reaction products of alkylene oxides, for example, ethylene oxide and/or propylene oxide, with initiators containing from 2 to 4 active hydrogen atoms per molecule. Suitable processes for the preparation of these additional polyether polyols, for example, include these disclosed by Wurtz in 1859 (see Encyclopedia of Chemical Technology, Vol. 7, pp. 257–262, published by Interscience Publishers, Inc. (1951) or U.S. Pat. Nos. 1,922,459 and 3,040,076, the contents of all of which are incorporated by reference. Generally, the alkylene oxide(s) is polymerized at pressures above atmospheric pressure with an initiator in the presence of a strongly basic material such as an alkali metal hydroxide or tertiary amine acting as an alkoxylation catalyst. Suitable catalysts include strong bases, such as hydroxides, e.g., potassium hydroxide and sodium hydroxide and the like. Suitable initiators include low molecular weight diols and polyols, for example glycols, glycerol, trimethylolpropane, triethanolamine, pentaerythritol, sorbitol and sucrose, and polyamines, for example ethylene diamine, tolylene diamine, diaminodiphenylmethane and polymethylene polyphenylene polyamines, and aminoalcohols, for example, ethanolamine and diethanolamine, and mixtures of such initiators.

Other conventional polymeric polyols that may be additionally present in the isocyanate reactive composition include polyester polyols obtained by the condensation of appropriate proportions of glycols and higher functionality polyols with dicarboxylic acids. Still further conventional polymeric polyols that may additionally be present in the isocyanate reactive composition include terminated polythioethers, polyamides, polyesteramides, polycarbonates, polyacetals, polyolefins and polysiloxanes. These polymeric polyols are those conventionally utilized in this art, and are prepared by conventional means.

The polyamines referred to hereinabove may have a molecular weight of at least 1000, and include amino-ended polyethers, polyesters, polyesteramides, polycarbonates, polyacetals, polyolefins and polysiloxanes.

The polyamines may also have a molecular weight below 1000, and these include aliphatic, cycloaliphatic or araliphatic polyamines containing two or more groups, such as the low molecular weight amino-ended polyethers and aromatic polyamines such as DETDA. Suitable imino- or enamino functional reactants include those compounds which are derived from the modification of the above described amino-functional compounds, e.g. upon their reaction with an aldehyde or ketone.

The polyester polyols referred to hereinabove which may be used include hydroxylterminated reaction products of polyhydric alcohols such as ethylene glycol, propylene glycol, diethylene glycol, 1,4-butanediol, neopentyl glycol, 1,6-hexanediol, cyclohexane dimethanol, glycerol, trimethylolpropane or polyether polyols or mixtures of such polyhydric alcohols, and polycarboxylic acids especially dicarboxylic acids or their ester-forming derivatives, for example, succinic, glutaric and adipic acids or their dimethyl esters, sebacic acid, phthalic anhydride, tetrachlorophthalic anhydride or dimethyl terephathalate or mixtures thereof. Polyesters obtained by the polymerization of lactones, for example, caprolactaones, in conjunction with a polyol or hydroxy carboxylic acids, such as hydroxy caproic acid, may also be used.

Polyesteramides may be obtained by the inclusion of aminoalcohols such as ethanolamine in polyesterification mixtures.

The polythioether polyols which may be used include products obtained by condensing thiodiglycol either alone or with other glycols, alkylene oxides, dicarboxylic acids, formaldehyde, amino-alcohols or aminocarboxylic acids. Polycarbonate polyols which may be used include products obtained by reacting diols such as 1,3-propanediol, 1,4-butanediol, 1,6-hexanediol, diethylene glycol or tetraethylene glycol with diaryl carbonates, for example, diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acctals.

Suitable polyolefin polyols include hydroxy-terminated butadiene homo-and copolymers and suitable polysiloxane polyols include polydimethylsiloxane diols and triols.

Other conventional polymeric polyols which may be additionally present in the isocyanate reactive composition include dispersions or solutions of addition or condensation polymers in polyols of the types described above. Such modified polyols, often referred to as "polymer polyols" have been fully described in the prior art and include products obtained by the in situ polymerization of one or more vinyl monomers, for example, styrene and/or acrylonitrile, in polymeric polyols, for example polyether polyols, or by the in situ reaction between a polyisocyanate and an amino- and/or hydroxy-functional compound, such as triethanolamine, in a polymeric polyol. Polyoxyalkylene polyols containing from 5 to 50% by weight of dispersed polymer are particularly useful. Particle sizes of the dispersed polymers of less than 50 microns are preferred.

The average molecular weight of these additional conventional polymeric polyols preferably range from 1000–8000 and most preferably from 1500–7000; the hydroxyl value preferably ranges from 15–200 and most preferably from 20–100.

The most preferred conventional polymeric polyols that may additionally be present in the isocyante reactive mixture are polyoxyethylene polyoxypropylene polyols having a number average molecular weight of 2000 to 7000, an average nominal functionality of 2–3 and an oxyethylene content of 10–20% by weight, preferably having the oxyethylene groups at the end of the polymer chain. These additional polymeric polyols (i.e., polyol ethers) may be present in the isocyanate reactive composition in amounts up to 50% by weight thereof.

In the total polyol blend in the isocyanate reactive composition, it is preferred that the diol/triol ratio in the polymeric polyols ranges from 20/60 to 60/20, with the preferred ratio ranging from about 30/50 to about 50/30.

Another component of the isocyanate reactive composition is the chain-extending agent. Suitable chain extenders will be evident to those skilled in the art from the present disclosure. In general, useful chain extenders are those having a formula weight below about 750 and preferably from about 62 to about 750. Suitable chain extenders have at least two functional groups which contain active hydrogen atoms, and include such examples as primary and secondary diamines, amino alcohols, amino acids, hydroxy acids, glycols and the like and mixtures thereof. It is preferred that they have a functionality of two. Preferred chain extenders are selected from polyols such as ethylene glycol, diethylene glycol, 1,4-butanediol, dipropylene glycol, and tripropylene glycol; aliphatic and aromatic amines, e.g. 4,4'-methylene dianilines having a lower alkyl ($C_1$–$C_6$) substituent positioned on each N-atom, and the like. Other chain extenders include primary and secondary amines which react more readily with the polyisocyanates utilized in the present invention than does water. These include phenylenediamine, ethylenediamine, diethylenetriamine, N-(2-hydroxypropyl)-ethylenediamine, N,N'-di-(2-hydroxylpropyl)-ethylenediamine, piperazine, 2-methylpiperazine, and the like. Compounds such as ethoxylated hydroquinone can also be employed as a chain extending agent. In addition, fatty amines and either amines can be employed as chain extending agents. Examples of ether amines includes primary ether amines of the formula

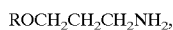
ROCH$_2$CH$_2$CH$_2$NH$_2$, and ether diamines, such as

ROCH$_2$CH$_2$CH$_2$NH CH$_2$CH$_2$CH$_2$NH$_2$, wherein R is alkyl containing 6–15 carbons, (both which are commercially available from TOMAH PRODUCTS); and ethoxylated amines of the formula:

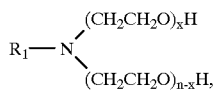

wherein $R_1$ is alkyl group containing 10 to 26 carbon atoms, n is the total number of moles of ethylene oxide and is 2–15, and x is 1 to 14 (commercially available from TOMAH PRODUCTS). Other ether amines include tallow based fatty amines, such as tallow amines, tallow diamines, tallow triamines, tallow tetramines, hydrogenated tallow amine, tallow diamine dioleate and the like. These tallow based fatty amines are also commercially available from TOMAH PRODUCTS. The above-mentioned chain extending agents can be used singularly, in combination or in admixture with other chain extending agents including diethylene glycol, dipropylene glycol, ethanolamine, N-methyldiethanolamine, and N-ethyldiethanolamine, as well as adducts obtained by esterification of aliphatic carboxylic acids with aliphatic diols or triols such as those exemplified above utilizing from 0.01 to 1.08 mole of acid per mole of diol/triol. The preferred chain extending agents are 1,4-butanediol, 1,6-hexanediol, neopentyl glycol, 1,4-cyclohexane diol, ethylene glycol, bishydroxyethoxybenzene, ethoxylated hydroquinone glycerine, and diethylene glycol either alone or in admixture.

The amount of chain extenders utilized will have an effect on the physical properties of the skin polyurethane foam. Therefore, in the present process it is important to utilize the chain extender in the amounts specified herein.

Generally, by increasing the amount of chain extenders in the polyether system, a harder foam will be produced. Without wishing to be bound, it is believed that the chain extender introduces hard segments into the elastomer. However, a significant increase in hardness is generally accompanied by a decrease in low temperature flexibility and a reduction in fatigue resistance to the elastomer. Without wishing to be bound, it is believed that the decrease in these physical properties is attributable to a decrease in the percentage of relatively long chain (soft) segments in the elastomer. Other disadvantages results if too much chain extender is used; for example, compatibility of the polyol in the isocyanate reactive composition and the chain extender in the resin decreases with increasing amounts of the short chain extender, thereby imposing significant processing problems and limitations on such systems. Moreover, bulk shipments and/or storage for even short periods of time are not economically tolerable due to the resulting phase separation of the polyol and the chain extender. Even in use, processing requires appropriate mixing to prevent phase separation. Incompatibility of the system and/or marginal mixing can adversely effect the physical properties of the ultimate polyurethane foam products. As soon as the reactant materials deviate appreciably from the stoichiometric balance between hydroxy and isocyanate ingredients, the resulting products, for example, shoe soles, will crack during wear, making these articles useless in commerce.

Although the amount of chain extender added to the isocyanate reactive composition is dependent upon the hardness requirement, to avoid the problems described hereinabove, the inventor has found that the chain extender be preferably present in amounts ranging from about 6.0% to about 12.5% by weight of the isocyanate reactive composition.

The blowing agent used according to the present invention is water. It is the sole blowing agent in the present process. Water reacts with isocyanate groups generating nascent carbon dioxide which then causes the polymer forming reaction mass to expand and acquire a reduced density. For the purpose of this invention, water is present in amounts effective to result in the polyurethane foam having the desired density as described herein. The amount of water utilized is based upon the density requirement of the shoe sole. Preferably, water is present in the range of from about 0.25% to about 0.70% of the total weight of the isocyanate reactive composition and more preferably from about 0.35% to about 0.60% by weight of the total isocyanate reactive composition.

The inventor has found that the amount of water used is related to the amount of chain extender present. More specifically, he has found that when the weight ratio of water to the chain extending agent ranges from about 0.01 to about 0.20 and more preferably from about 0.02 to about 0.09, polyurethane foams having the requisite characteristics were formed. This is a characteristic that makes the present polyurethane foam quite unique from other flexible foams since in most flexible foams, this ratio is greater than 1 and usually greater than 10. Thus, in flexible foams produced in the prior art, the ratio is at least 5 times greater and usually one order of magnitude greater than the ratio utilized in preparing the reaction product of the present invention.

The present reaction system may further comprise conventionally used additives, such as flame retardants and catalysts, as needed for particular applications. Useful flame retardants include phosphonates, phosphites and phosphates, such as tris-(2-chloroisopropyl) phosphate (TCPP), dimethyl methyl phosphonate, ammonium polyphosphate and various cyclic phosphates and phosphonate esters known in the art; halogen-containing compounds known in the art, such as brominated diphenyl ether and other brominated aromatic compounds; melamine; antimony oxides, such as antimony pentoxide and antimony trioxide; zinc compounds such as zinc oxide; alumina trihydrate; and magnesium compounds, such as magnesium hydroxide. The flame retardants may be used in any suitable amount which will be evident to those skilled in the art. However, it is preferred that the flame retardant be used in an amount of 0 to 55% of the isocyanate reactive component of the present invention.

Useful catalysts include tertiary amines, organometallic compounds and amides of saturated or unsaturated $C_{12}$–$C_{24}$ fatty acids and di, tri or tetra-aminoalkanes having at least one catalytic amino group and at least one reactive amino group. Fatty amido-amines having hydroxyl substituents may also be used. A particularly preferred amido-amine compound is the reaction product N,N-dimethyl propyl diamine and a mixed fatty carboxylic acid available as BUSPERSE® 47 from Buckman Laboratories. Other preferred catalysts are triethylene diamine, bis-(2-(N,N-dimethylamino) ethyl) ether, and mixtures thereof. Other catalysts which may be used include heterocyclic amines and salts of tertiary amines (e.g., "delayed action catalysts"). The catalysts are used in amounts necessary for a particular application which will be evident to one skilled in the art from the present disclosure.

Other conventional additives generally used in the art may also be used in the present invention. Examples of suitable additives include fillers, such as calcium carbonate, silica, mica, wollastonite, wood flour, melamine, glass or mineral fibers, glass spheres, etc.; pigments, such as carbon black; surfactants; internal mold release agents; and platicizers. Such additives will be used in amounts which will be evident to one skilled in the art from the present disclosure.

Suitable surfactants include the diverse silicone surfactants, preferably those which are block copolymers of a polysiloxane and a polyoxyalkylene. Exemplary of such surfactants are the products DC-193 and Q4-3667 available from Dow Corning and Tegostab B4113 available from Goldschmidt. Other suitable surfactants also include non-silicone containing surfactants, such as poly (alkyleneoxides). When present, the amount of surfactants advantageously employed is from 0.1 to 2%, and preferably from 0.2% to 1.3% of the total weight of the isocyanate reactive composition.

The polyurethanes are formulated and shaped into molded objects by casting methods conventionally known in the art, generally involving the use of a casting machine. Examples of low pressure casting machines include those offered commercially by Klockner Ferromatik Desma, Inc., Erlander, Ky., including the DS 30/30 and PSA 91, while high pressure models including machines made by Cannon Corp. may also be used.

In the casting process, the polyisocyanate composition is referred to as the "A" component and the isocyante reactive composition and water is referred to as the "B" component. If additives are employed, they are generally incorporated into the "B" component, although they may also be added in the "A" component so long as they are not isocyanate-reactive. The "B" component mixture, including additives, may be blended or agitated in a suitable container or supply tank, generally in the range of about 20° C. to about 50° C., although temperatures up to about 75° C. may be employed. Agitation can be conducted using conventional propeller type stirrers (generally supplied by the casting machine manufacturer) at RPM's of several hundred at most.

The "A" and "B" components are placed in separate containers, which are generally equipped with agitators, of the casting machine wherein the temperature of each component is about ambient to about 70° C. Molded polyurethane products are made by conducting each component via suitable metering pumps, to a mixing head where the components are mixed under low pressures, generally pressures less than about 30 bar, preferably less than about 20 bar. The mixed components are then poured or injected into a mold.

Once a desired mold shape has been filled, the mold is closed and curing is effected. Generally curing temperatures of about 30° C. to about 60° C. are used. Curing (as reflected by demold times) requires about 1 to 30 minutes, usually about 3 to 10 minutes. This cure time is ample to allow mixing; foaming if desired, and mold filling, yet sufficiently rapid to allow high rates of production.

The reaction of the "A" component and "B" component to make the molded polyurethaneu is carried out at an isocyanate index between about 0.85 and about 1.15, preferably between about 0.90 and about 1.05. Most preferably, the reaction is carried out at an isocyanate index of about to 0.95 to about 1.0 when based on total active hydrogens available including the water reaction.

The polyurethane foams prepared by the present invention are not low density polyurethane foams. The density of the product ranges from 0.1 to about 1.1 spg, preferably from about 0.25 to 0.80 and more preferably from 0.3 to about 0.75 spg. Unlike low density polyurethane foams, the polyurethane foams prepared by the present invention display excellent mechanical characteristics, including abrasion resistance, durability, stability and flexibility, making them ideal for use as a shoe sole.

In the utilization of the present invention(s) to manufacture integral skin microcellular polyether elastomer articles, such as shoe soles, an aspect which is highly preferred, either of two commonly employed sole making processes are satisfactory. In one process, the left and right foot soles are cast as unit soles, removed from the cast, and then attached to the shoe uppers by a suitable adhesive. In the other process, the shoe uppers, i.e., left and right foot, are presented as one mold surface and the formulation is injected into the mold cavity defined by the shoe uppers and the mold walls. In either case, the molds are closed wall molds so as to obtain the mold defined sole shape. This sole shape may not necessarily be smooth and may have built-in mold ridges such as for resiliency, cushioning, lugs for slip resistance, etc.

In either process, the typical adhesives (also called "cements") for attaching (also called "cementing") the soles to the uppers are well known. In the second process, i.e., the direct attachment, the adhesive may be the cast polyurethane minus the blowing agent which is cured with the cast foam as it cures, or it may be a different polyurethane adhesive.

Unless stated to the contrary, all percentages are weight percentages. In addition, unless indicated to the contrary, all weights are in grams.

The following examples further illustrate the invention.

In the examples, the following formulations and reaction components are referenced:

| | |
|---|---|
| Daltocel ® F459 | Polyether diol having a 20.7% ethylene oxide (EO) cap and an equivalent weight of 1870. |
| Daltocel ® F435 | Polyether polyoxypropylene triol having a 16.4% EO cap and an equivalent weight of 1600. |
| Arcol ® 2580 | Polyether polyol, random copolymer of ethylene oxide and propylene oxide containing 75% EO. Equivalent weight = 1336, OH# = 42 |
| Dabco ® EG | Triethylene diamine in ethylene glycol |
| Niax ® Al | Tertiary amine catalyst (dimethylamino diethyl ether in dipropylene glycol, ratio 1/3 w/w) |
| Dabco ® 1027 | Heterocyclic amine catalyst in ethylene glycol |
| DC 193 | Silicone surfactant |
| LI 412T | Silicone-type internal mold release agent (mixture of amino functional polyether polysiloxanes) OH # = 25 |
| Suprasec ® 2433 | 54.3% Pure MDI(97.5%4,4'MDI/2.5%2.4'MDI) 39.7% Daltocel F481 (ethylene oxide capped diol) EO content = 27.1% Equivalent Wgt = 1870 6.0% Suprasec ® 2020 (uretonimine-modified MDI) |
| Arcol ® 34-28 | Polyether triol having a 15% ethylene oxide (EO) capped and 20% polymer dispersion (10% acrylonitrile and 10% styrene) having an equivalent of about 2,000 and OH# = 28. |
| Datocel ® F481 | Polyether capped diol of equivalent wt. 1870, having 27.1% EO (remainder PO). |

EXAMPLE 1

In this example, a polyurethane foam was prepared by mixing the prepolymer (Suprasec® 2433) with the isocyanate reactive composition in the presence of water in a low pressure casting machine (DS 30/30 or PSA 91, both of which are sold by Klockner Ferromatik Desma, Inc.) in accordance with the procedure described herein. The amounts of each component utilized are tabulated hereinbelow by weight:

| Component | % (w/w) |
|---|---|
| A. Polyisocyanate | |
| 1. Suprasec ® 2433 | 71% |
| B. Isocyanate Reactive Component | |
| 1. Daltocel ® F-435 | 31.64 |
| 2. Arcol ® 34-28 | 10.0 |
| 3. Datlocel ® F-481 | 44.72 |
| 4. Arcol ® 2580 | 3.0 |
| 5. Ethylene glycol | 6.0 |
| 6. Dabco ® GG | 1.8 |
| 7. NIAX ® Al | 0.3 |
| 8. Dabco ® 1027 | 0.3 |
| 9. DC 193 | 0.3 |
| 10. LI 412T | 1.5 |
| Component | |
| C. $H_2O$ | 0.44 |

More specifically, Suprasec®2433 was prepared by placing substantially pure MDI (54.3 Kg./100 Kg. Suprasec®2433) comprised of a mixture of 97.5% 4,4'MDI and 2.5% 2,4'-MDI into a reaction vessel at 40° C. The temperature of the reaction vessel was raised to 80° C. and Daltocel®F481 (39.7 Kg./100 Kg. Suprasec® 2433) was added. The mixture was stirred at 80° C. for 2½ hours, at which time the NCO content of the mixture was determined to be in the range of 18.25–18.65%. Suprasec® 2020 (6 Kg./100 Kg. Suprasec® 2433) was added to the reaction mixture at 80° C. and it was allowed to mix for 30 minutes. The reaction mixture was then allowed to cool to room temperature, and the final NCO content was found to be between 18.90%–19.3%. The contents were placed in a container of a low pressure casting machine equipped with an agitator and temperature control system to control the components temperature in the range of 5° C.–70° C.

Component B consisting of the isocyanate reactive components and water in the amounts listed hereinabove were mixed at room temperature in a second container of the casting machine equipped with an agitator and temperature control system to control the components temperature in the range of 5° C.–70° C. The molded polyurethane product was made by conducting each component in the weight ratio indicated hereinabove via suitable pumps of the casting machine into the mixing head wherein the components are mixed under low pressures, the pressure being less than 20 bar. The mixture of the two components were next casted into the appropriate mold of Style A or Style B shoe style (see FIGS. 1–2).

Once the desired mold shape was filled, the mold was closed, and curing was effected at a curing temperature of 30–60° for about 3 to 10 minutes, and the shoe sole of Style A or B comprised of polyurethane foam was formed.

The polyurethane foam was molded into a shoe sole of ether style A or B (see FIGS. 1 and 2, respectively) using the appropriate shoe mold. "Free Time" Style Mold of San Antonio Shoes Company was used for the preparation of the A style shoe sole and "Bounce" Style mold of Wolverine World Wide Co. was used for the B style shoe sole.

FIG. 1 depicts the style A shoe sole (1). The SAS on the lower sole component half (5) identifies it as the San Antonio Shoe Style. The shoe sole contains a pattern of indentations (2) in the upper sole component half (forefoot) and the lower sole component half. The thickness of the sole is relatively thin; it is 5/16". Various channels (3) are present in both the forefoot and the lower sole. The depth of the grooves is less than 1/16". These grooves have rounded corners, and they do not form a straight line. If shoe cracking occurs, it occurs in the area designed as (4).

Figure 2:
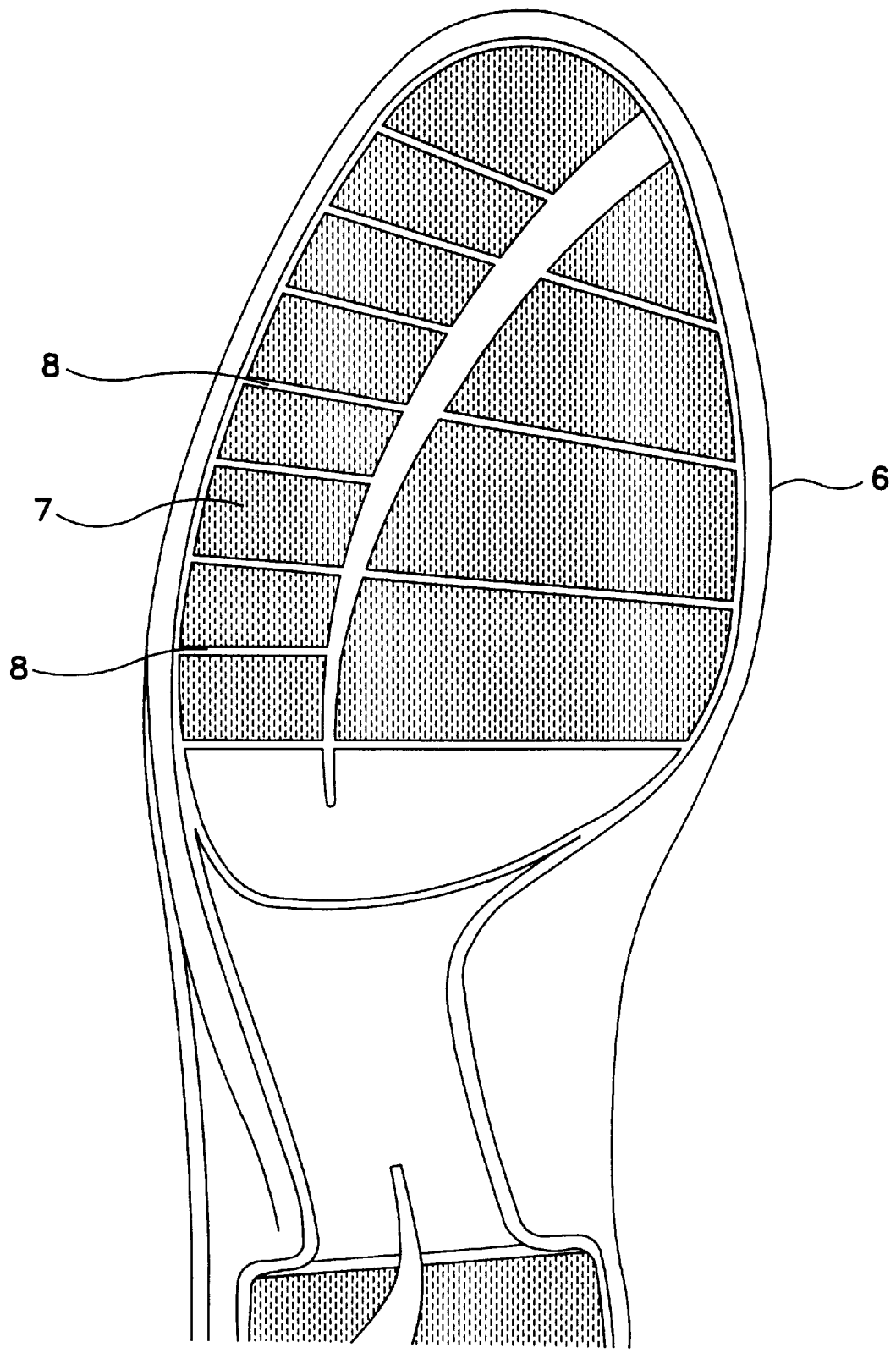
FIG. 2 depicts a shoe sole design identified herein as Style B comprised of the polyurethane foam of the present invention.

FIG. 2 depicts the style B shoe sole (6). This shoe style is quite distinct from that of shoe style A. The forefoot (7) is relatively thick; the thickness thereof is equal to 1/2" or greater. The forefoot contains a pattern consisting of channels forming grooves (6) with the depth of these grooves being 3/32" thick. Unlike the grooves in style A, these grooves form a straight line across the forefoot. Furthermore, they form square-like corners, instead of the rounded corners in style A.

Comparative Examples 1–3

Comparative Example 1 is a traditional formulation for preparing a polyurethane using polyether polyol having a EO content of less than 25% by weight.

Comparative Examples 2 and 3 describe two formulations in which only 1 type of polyether polyol of high EO content is utilized. In comparative Example 2, only the high ethylene oxide polyether polyol was utilized in the absence of the random EO/PO copolymer, while in Comparative Example 3, the random EO/PO copolymer was utilized but in the absence of the high ethylene oxide polyether polyol. The various formulations were prepared in accordance with the procedure described in Example 1 wherein the Suprasec® 2433 was mixed with the polyether polyol in a casting machine and then molded into the appropriate shoe style. The formulations in Comparative Examples 1–3 are tabulated hereinbelow.

Formulation for Comparative Examples 1–3

| | Wt % | | |
|---|---|---|---|
| Component | Comparative Example 1 | Comparative Example 2 | Comparative Example 3 |
| 1. Polyisocyanate Suprasec 2433 | 71 | 71 | 71 |
| 2. Isocyanate Reactive Component | | | |
| 1. Daltocel ® F459 | 44.72 | 44.72 | 0 |

-continued

Formulation for Comparative Examples 1–3

| | Wt % | | |
|---|---|---|---|
| Component | Comparative Example 1 | Comparative Example 2 | Comparative Example 3 |
| 2. Daltocel ® F435 | 34.64 | 31.64 | 34.64 |
| 3. Arcol ® 34–28 | 10.0 | 10.0 | 10.0 |
| 4. Daltocel ® F-481 | 0 | 0 | 44.72 |
| 5. Arcol ® 2580 | 0 | 3 | 0 |
| 6. Ethylene Glycol | 6.0 | 6.0 | 6.0 |
| 7. Dabco ® EG | 1.8 | 1.8 | 1.8 |
| 8. Niax ® Al | 0.3 | 0.3 | 0.3 |
| 9. Dabco ® 1027 | 0.3 | 0.3 | 0.3 |
| 10. DC 193 | 0.3 | 0.3 | 0.3 |
| 11. LI 412T | 1.5 | 1.5 | 1.5 |
| 3. H$_2$O | 0.44 | 0.44 | 0.44 |

EXAMPLE 2

This example compares the flexible fatigue of the shoe sole prepared from the polyurethane foam of Example 1 and the comparative examples. polyurethane produced in Example 1 and comparative examples 1–3 were compared utilizing a standard test known as Bata Belt Flex test, as described in "Physical Test Method", published by SATRA Footwear Technology Center, February 1989, pp. 1–9, the contents of which are incorporated by reference. The sample is placed on a belt flexing machine manufactured by Satra Footwear Technology Center, Kettering North-Hamptonshire, England which subjects the forefoot of the sole to flexing stress. Thus, this test measures the ability of the shoe style prepared from the polyurethane foam to withstand cracking as a result of the millions of cycles of bending to which each shoe sole is subjected.

The relationship of the results of Bata Belt Flex and risk of fatigue cracking is listed in the following table I:

TABLE I

| Bata, Belt Flex, kcs | Risk of Fatigue Cracking |
|---|---|
| Less than 5 | Very high |
| 5–15 | High |
| 15–35 | Medium |
| 35–50 | Low |

The results of the Bata Belt Flex test on the various shoe soles prepared from the polyurethane foam produced in Example 1 and the Comparative examples set forth in Table II are tabulated hereinbelow:

TABLE II

| | Flex Fatigue Property | | | | | | | | | | | | | | | |
|---|---|---|---|---|---|---|---|---|---|---|---|---|---|---|---|---|
| | 1. Comparative Example 1 | | | | 2. Comparative Example 2 | | | | 3. Comparative Example 3 | | | | 4. Example 1 | | | |
| | Shoe sole density, g/cc | | | | | | | | | | | | | | | |
| | 0.50 | | 0.46 | | 0.50 | | 0.46 | | 0.50 | | 0.46 | | 0.50 | | 0.46 | |
| Style | A | B | A | B | A | B | A | B | A | B | A | B | A | B | A | B |
| Bata belt flex, kcs | 35–40 | 10–15 | 15–20 | 5–10 | 35–50 | 10–15 | 20–35 | 5–10 | 35–50 | 20–30 | 20–35 | 10–15 | >50 | 35–50 | 50 | 20–30 |

As shown by the data in the table, for the soles comprised of the polyurethane prepared in Comparative Examples 1–3, the Bata belt flex values were significantly lower than that of the soles made from the polyurethane foam prepared in accordance with the present invention (i.e., Example 1).

These results show that there is a marked and significant improvement in the Bata belt flex property when the shoe sole was prepared from the polyurethane of the present invention. The data accurately reflect that the combination of the two high ethylene oxide polyether polyols in the isocyanate reactive component provides a synergistic effect. The flex fatigue performance of the polyurethane produced when both polyols were present was significantly improved, i.e., the shoe soles became significantly more flexible relative to the shoe soles comprised of a polyurethane foam prepared from the isocyanate composition containing either one (Comparative Example 2, 3) or neither (Comparative Example 1) polyol.

The above preferred embodiments and examples were given to illustrate the scope and spirit of the present inventor. These embodiments and examples will make apparent to those skilled in the art other embodiments and examples. The other embodiments and examples are within the contemplation of the present invention. Therefore, the present invention should be limited only by the appended claims.

What is claimed is:

1. A flexible integral skin polyurethane foam prepared by intimately contacting under effective reaction conditions a polyisocyanate composition with an isocyanate reactive composition in the presence of a water blowing agent, wherein (a) the polyisocyanate composition has a free NCO value of about 15% to about 25% by weight and comprises an isocyanate terminated prepolymer prepared from the reaction of an excess of organic polyisocyanate and a first ethylene oxide capped polymer polyol having an average nominal hydroxyl functionality of 2–6, an equivalent weight ranging from about 700 to about 5,000 and an ethylene oxide content of at least about 25% by weight, whereby at least 50% of the ethylene oxide group is present at the end of the polyether polyol;

(b) the isocyanate reactive composition comprises a chain extending agent that is present in amounts ranging from about 6.0% to about 12.5% by weight, and a mixture of a second ethylene oxide capped polyether polyol and a random copolymer of ethylene oxide and propylene oxide in synergistically effective amounts to form said polyurethane foam, said second ethylene oxide capped polyol having an average nominal hydroxyl functionality of 2–3, an equivalent weight ranging from about 700 to about 5000 and an ethylene oxide content of at least weight 25% by weight thereof wherein at least about 50% of the ethylene oxide group being present at the end of the polyether polyol and said copolymer having an average nominal hydroxyl functionality of 2–3, an equivalent weight ranging from about 700 to about 5000 and an ethylene oxide content of at least about 60% by weight; and (c) water, as the sole blowing agent present in an amount effective to provide the resulting polyurethane with a density ranging from about 0.1 to about 1.1 sp.gr, wherein the weight ratio of water to the chain extending agent ranges from about 0.01 to about 0.20.

2. The polyurethane foam of claim 1 wherein said isocyanate reactive composition contains a diol and a triol, the diol/triol weight ratio ranging from about 1:3 to about 3:1.

3. The polyurethane foam of claim 1 wherein the second ethylene oxide capped polyol is present in said mixture in an amount ranging from about 20% to about 80% by weight of the isocyanate reactive composition and the copolymer is present in an amount ranging from about 1.5% to about 23% by weight of the isocyanate reactive composition.

4. The polyurethane foam of claim 3 wherein the second ethylene oxide capped polyether polyol is present in an amount ranging from about 40% to about 60% by weight of the isocyanate reactive composition.

5. The polyurethane foam of claim 3 wherein the copolymer is present in an amount ranging from about 2% to about 5% by weight of the isocyanate reactive composition.

6. The polyurethane foam of claim 1 wherein the ethylene oxide content of the second ethylene oxide capped polyol ranges from about 25% to about 35% by weight thereof and the ethylene oxide content of the copolymer ranges from about 60% to about 85% by weight thereof.

7. The polyurethane foam of claim 1 wherein the equivalent weight of the second ethylene oxide capped polyol ranges from about 1,000 to about 3,000.

8. The polyurethane foam of claim 7 wherein the equivalent weight of the second ethylene oxide capped polyol ranges from about 1,200 to about 2,000.

9. The polyurethane foam of claim 1 wherein the equivalent weight of the copolymer ranges from about 1,000 to about 3,000.

10. The polyurethane foam of claim 9 wherein the equivalent weight of the copolymer ranges from about 1,200 to about 2,000.

11. The polyurethane foam of claim 1 wherein water is present in an amount ranging from about 0.25% to about 0.70% by weight of the isocyanate reactive composition.

12. The polyurethane foam of claim 1 wherein the weight ratio of water to the chain extending agent ranges from about 0.02 to about 0.09.

13. The polyurethane foam of claim 1 wherein the density thereof ranges from about 0.25 to about 0.80 sp gr.

14. The polyurethane foam of claim 13 wherein the density thereof ranges from about 0.30 to about 0.75 sp. gr.

15. The polyurethane foam of claim 1 wherein the polyisocyanate composition is reacted with the isocyanate reactive composition in a weight ratio ranging from about 0.4 to about 2.5.

16. The polyurethane foam of claim 1 wherein the polyisocyanate composition has a free NCO value of about 17% to about 21% the first polyether polyol has an average nominal hydroxyl functionality of 2–4, an equivalent weight of about 1,000 to about 3,000 and has an ethylene oxide content ranging from about 25% to about 35% by weight thereof, and the organic polyisocyanate used for preparing the prepolymer is a diphenylmethane diisocyanate based polyisocyanate.

17. The polyurethane foam of claim 16 wherein said prepolymer is prepared form the reaction of an excess amount of phenylmethanediisocyanate based polyisocyanate and said polyol, wherein said diphenylmethane diisocyanate contains about 5% to about 15% by weight MDI variant, greater than about 85% by weight 4,4' MDI and less than about 5% by weight 2,4'-MDI.

18. The polyurethane foam of claim 16 wherein said phenylmethane diisocyanate based polyisocyanate contains at least 85% by weight of 4,4'-MDI or a variant thereof.

19. The polyurethane foam of claim 1 wherein at least about 90% of the groups on the prepolymer formed by reacting the polyisocyanate and the polyol are urethane groups.

20. A process for preparing a flexible polyurethane foam comprising contacting under effective reaction conditions a polyisocyanate composition with an isocyanate reactive composition in the presence of water as the sole blowing agent, wherein (a) the polyisocyanate composition has a free NCO value of about 15 to about 25% by weight and comprises an isocyanate terminated prepolymer prepared from the reaction of an excess of organic polyisocyanate and a first ethylene oxide capped polymer polyol having an average nominal hydroxyl functionality of 2–6, an equivalent weight ranging from about 700 to about 5,000 and an ethylene oxide content of at least about 25% by weight whereby at least 50% of the ethylene oxide group is present at the end of the polyether polyol;

(b) the isocyanate reactive composition comprises a chain extending agent that is present in amounts ranging from about 7.0% to about 12.5% by weight, and a synergistically effective amount of a mixture of a second ethylene oxide capped polyether polyol and a random copolymer of ethylene oxide and propylene oxide to form said polyurethane foam polyurethane foam, said second ethylene oxide capped polyol having an average nominal hydroxyl functionality of 2–3, an equivalent weight ranging from about 700 to about 5000 and an ethylene oxide content of at least weight 25% by weight thereof wherein at least about 50% of the ethylene oxide group is present at the end of the polyether polyol and said copolymer has an average nominal hydroxyl functionality of 2–3, an equivalent weight ranging from about 700 to about 5000 and an ethylene oxide content of at least about 60% by weight; and (c) water, as a sole blowing agent, present in an amount effective to provide the resulting polyurethane with a density ranging from about 0.1 to about 1.1 sp. gr, wherein the weight ratio of water to the chain extending agent ranges from about 0.01 to about 0.20.

21. The process of claim 20 wherein said isocyanate reactive composition contains a diol and a triol, the diol/triol weight ratio ranging from about 1:3 to about 3:1.

22. The process of claim 20 wherein the second ethylene oxide capped polyol is present in said mixture in an amount ranging from about 20% to about 80% by weight of the isocyanate reactive composition and the copolymer is present in an amount ranging from about 1.5% to about 23% by weight.

23. The process of claim 22 wherein the polyol is present in an amount ranging from about 40% to about 60% by weight of the isocyanate reactive composition.

24. The process of claim 22 wherein the copolymer is present in an amount ranging from about 2% to about 5% by weight of the isocyanate reactive composition.

25. The process of claim 20 wherein the ethylene oxide content of the second ethylene oxide capped polyol ranges from about 25% to about 35% by weight thereof and the ethylene oxide content of the copolymer ranges from about 60% to about 85% by weight thereof.

26. The process of claim 20 wherein the equivalent weight of the second ethylene oxide capped polyol ranges from about 1,000 to about 3,000.

27. The process of claim 26 wherein the equivalent weight of the second ethylene oxide capped ranges from about 1,200 to about 2,000.

28. The process of claim 20 wherein the equivalent weight of the copolymer ranges from about 1,000 to about 3,000.

29. The process of claim 28 wherein the equivalent weight of the copolymer ranges from about 1,200 to about 2,000.

30. The process of claim 20 wherein water is present in an amount ranging from about 0.25 to about 0.70% by weight of the isocyanate reaction composition.

31. The process of claim 20 wherein the weight ratio of water to the chain extending agent ranges from about 0.02 to abut 0.09.

32. The process of claim 20 wherein the density thereof ranges from about 0.25 to about 0.80 sp. gr.

33. The process of claim 32 wherein the density thereof ranges from about 0.30 to about 0.75 sp. gr.

34. The process of claim 20 wherein the polyisocyanate composition is reacted with the isocyanate reaction composition in a weight ratio ranging from about 0.3 to about 3.0.

35. The process of claim 20 wherein the polyisocyanate composition has a free NCO value of about 17 to about 21% by weight, the polyether polyol has an average nominal hydroxyl functionality of 2–4, an equivalent weight of about 1,000 to about 3,000 and an ethylene oxide content ranging from about 25% to about 35% by weight thereof, and the organic polyisocyanate used for preparing the prepolymer is a diphenylmethanediisocyanate based polyisocyanate.

36. The process of claim 35 wherein said prepolymer is prepared from an excess amount of a phenyl methane diisocyanate based polyisocyanate and said polyol, wherein said phenylmethanediisocyanate based polyisocyanate contains about 5% to about 15% by weight MDI variant, greater than about 85% by weight 4,4'-MDI and less than about 5% by weight 2,4'-MDI.

37. The process of claim 35 wherein said phenylmethane diisocyanate based polyisocyanate contains at least 85% by weight of 4,4'-MDI or a variant thereof.

38. The process of claim 20 wherein at least about 90% of the groups on the prepolymer formed by reacting the polyisocyanate and the first polyol are urethane groups.

39. A reaction system comprising (a) a polyisocyanate composition comprising an isocyanate terminated prepolymer prepared by reciting an excess of organic polyisocyante and a first ethylene oxide capped polymer polyol having an average nominal hydroxyl functionality of 2–6, an equivalent weight ranging from about 700 to about 5,000, and an ethylene oxide content of at least about 25% by weight, whereby at least 50% of the ethylene oxide group is present at the end of the polyether polyol, (b) an isocyanate reactive composition comprising a chain extending agent that is present in amounts ranging from about 6.0% to about 12.5% by weight, and a mixture of a second ethylene oxide capped polyether polyol and a random copolymer of ethylene polyols and a random copolymer of ethylene oxide and propylene oxide, said second ethylene oxide capped polyol having an average nominal hydroxyl functionality of 2–3, an equivalent weight ranging from about 700 to about 5,000 and an ethylene oxide content of at least about 25% by weight thereof, wherein at least about 50% of the ethylene oxide group thereof is present at the end of the polyether polyol, and said copolymer having an average nominal hydroxyl functionality of 2–3, an equivalent weight ranging from about 700 to about 5,000 in an ethylene oxide content of at least about 60% by weight; and (c) water, wherein the free NCO value of the polyisocyanate composition ranges from about 15% to about 25%, and wherein the weight ratio of water to the chain extending agent ranges from about 0.01 to about 0.20.

40. The reaction system according to claim 39 wherein the weight ratio of the polyisocyanate composition to isocyanate reactive composition ranges from about 0.4 to about 2.5.

41. The reaction system according to claim 39 wherein the weight ratio of water to the chain extending agent range from about 0.02 to about 0.09.

42. The reaction system according to claim 39 wherein the polyisocyanate composition has a NCO value of about 17% to about 21%.

43. The reaction system according to claim 39 wherein the polyisocyanate composition has a NCO value of about 17% to about 31%, the first polyether polyol has an average nominal hydroxyl functionality of 2–4, an equivalent weight of about 1,000 to about 3,000 and has an ethylene oxide content ranging from about 25% to about 35% by weight thereof, and the organic polyisocyanate is a diphenylmethane diisocyanate based polyisocyanate.

44. The reaction system according to claim 43 wherein said diphenylmethane diisocyanate contains about 5% to about 15% by weight MDI variant, greater than about 85% by weight 4,4'-MDI and less than 5% by weight 2,4'-MDI.

45. The reaction system according to claim 43 wherein said diphenylmethane diisocyanate based polyisocyanate contains at least 85% by weight of 4,4'-MDI or a variant thereof.

* * * * *